US011928266B2

(12) United States Patent  
Watanabe et al.

(10) Patent No.: US 11,928,266 B2
(45) Date of Patent: Mar. 12, 2024

(54) INFORMATION PROCESSING APPARATUS AND CONTROLLING METHOD

(71) Applicant: Lenovo (Singapore) Pte. Ltd., Singapore (SG)

(72) Inventors: Daisuke Watanabe, Kanagawa (JP); Takahide Wada, Kanagawa (JP); Akihiro Miyano, Kanagawa (JP); Mamoru Okada, Kanagawa (JP); Naoyuki Araki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/973,815

(22) Filed: Oct. 26, 2022

(65) Prior Publication Data

US 2023/0205323 A1 Jun. 29, 2023

(30) Foreign Application Priority Data

Dec. 28, 2021 (JP) .................................. 2021-214123

(51) Int. Cl.
*G06F 3/02* (2006.01)
*G06F 3/04812* (2022.01)
*G06F 3/0482* (2013.01)

(52) U.S. Cl.
CPC ........ *G06F 3/0213* (2013.01); *G06F 3/04812* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 2002/0070918 A1* | 6/2002 | Grivas | H04M 1/233 345/161 |
| 2005/0021851 A1* | 1/2005 | Hamynen | G06F 16/9577 715/205 |
| 2011/0175811 A1* | 7/2011 | Edmister | G06F 3/021 345/161 |

FOREIGN PATENT DOCUMENTS

| | | |
|---|---|---|
| JP | 2002-018556 A | 1/2002 |
| JP | 2016-053779 A | 4/2016 |
| JP | 2016-066133 A | 4/2016 |
| JP | 6705033 B1 | 6/2020 |
| WO | 2018/129720 A1 | 7/2018 |

OTHER PUBLICATIONS

ThinkPad i Series 1124 user's reference, Japan, IBM Japan, Ltd., vol. 1, pp. 10-13, 50-53, May 2000. (12 pages).

* cited by examiner

*Primary Examiner* — Carl Adams
(74) *Attorney, Agent, or Firm* — Osha Bergman Watanabe & Burton LLP

(57) ABSTRACT

The information processing apparatus includes a pointing stick which is disposed on a keyboard, has an operable stick and is possible to detect a displacement in an installation plane direction of the stick and a displacement in a direction which is vertical to the installation plane and a main control unit which displays a predetermined menu screen on a display unit in a case where the pointing stick detects a specific operation which includes the displacement of the stick in the vertical direction.

4 Claims, 6 Drawing Sheets

INFORMATION PROCESSING APPARATUS AND CONTROLLING METHOD

CROSS-REFERENCE TO RELATED APPLICATIONS

This application claims priority to Japanese Patent Application No. 2021-214123 filed on Dec. 28, 2021, the contents of which are hereby incorporated herein by reference in their entirety.

BACKGROUND OF THE INVENTION

Field of the Invention

The present invention relates to an information processing apparatus and a controlling method.

Description of the Related Art

In the information processing apparatus such as a laptop personal computer (the laptop PC) and so forth, the apparatus of the type which includes a pointing stick as one of pointing devices is known (for example, see Japanese Patent No. 6705033). In the information processing apparatus of the above-mentioned type, an operation of moving a pointer on a screen or the like is performed by utilizing the pointing stick.

Incidentally, in the existing information processing apparatus of the type which is described above, for example, in a case of changing settings of a camera, a microphone and so forth, it is necessary to display a settings menu screen by performing an operation of selecting the settings menu screen via a start menu screen by using a pointing device such as the pointing stick and so forth. It is difficult for the existing information processing apparatus to display the settings menu screen and so forth more easily as described above and a user interface which attains high usability by utilizing the pointing stick is sought for.

SUMMARY OF THE INVENTION

The present invention aims to provide an information processing apparatus and a controlling method which make it possible to realize the user interface which attains the high usability by utilizing the pointing stick.

According to one aspect of the present invention, there is provided an information processing apparatus which includes a pointing stick which is disposed on a keyboard, has an operable stick and is possible to detect a displacement in an installation plane direction of the stick and a displacement in a direction which is vertical to the installation plane and a main control unit which displays a previously determined menu screen on a display unit in a case where the pointing stick detects a specific operation which includes the displacement of the stick in the vertical direction.

In addition, according to one aspect of the present invention, the information processing apparatus may also include a sub control unit which receives plane displacement information which indicates the displacement in the installation plane direction that the pointing stick detects via a first interface and transmits the received plane displacement information to the main control unit, and receives a notification that the pointing stick detects the specific operation which is performed on itself via a second interface and notifies the main control unit of event information which notifies detection of the specific operation.

In addition, according to one aspect of the present invention, in the information processing apparatus, the specific operation may be a double-tap operation of depressing the stick two times in the vertical direction and in a case where the pointing stick detects the double-tap operation, the main control unit may display the menu screen on the display unit.

In addition, according to one aspect of the present invention, in the information processing apparatus, the main control unit may include a utility processing section which senses that the pointing stick detects the specific operation in accordance with an event of a hotkey and a GUI) processing section which displays the menu screen on the display unit in a case where the utility processing section receives the event of the hotkey.

In addition, according to one aspect of the present invention, in the information processing apparatus, the GUI processing section, in a case where the GUI processing section detects inputting of a specific combination of a plurality of keys which includes a modifier key via the keyboard in a permitted state where execution of a process of displaying the menu screen is permitted, may ignore detection of the specific operation and may transition to a prohibited state where execution of the process of displaying the menu screen is prohibited, and in a case where the GUI processing section detects the inputting of the specific combination of the plurality of keys which includes the modifier key via the keyboard in the prohibited state, may transition to the permitted state.

In addition, according to one aspect of the present invention, in the information processing apparatus, the GUI processing section may transition to a hidden state where the menu screen is not displayed on the display unit in a case where an out-of-area part of the menu screen is clicked or in a case where a display exit button in the area of the menu screen is clicked.

In addition, according to one aspect of the present invention, in information processing apparatus, the menu screen may be a screen which displays a menu of changing a setting of an input device or an output device.

In addition, according to one aspect of the present invention, there is provided a method of controlling an operation of an information processing apparatus which includes a pointing stick which is disposed on a keyboard, has an operable stick and is possible to detect a displacement in an installation plane direction of the stick and a displacement in a direction which is vertical to the installation plane, including controlling to display a predetermined menu screen on a display unit by a main control unit in a case where the pointing stick detects a specific operation which includes the displacement of the stick in the vertical direction.

In addition, according to the above aspect of the present invention, it becomes possible to realize the user interface which attains the high usability by utilizing the pointing stick.

DETAILED DESCRIPTION OF THE INVENTION

In the following, an information processing apparatus according to embodiments of the present invention and a controlling method for controlling operations of the information processing apparatus with reference to the drawings.

Figure 1:
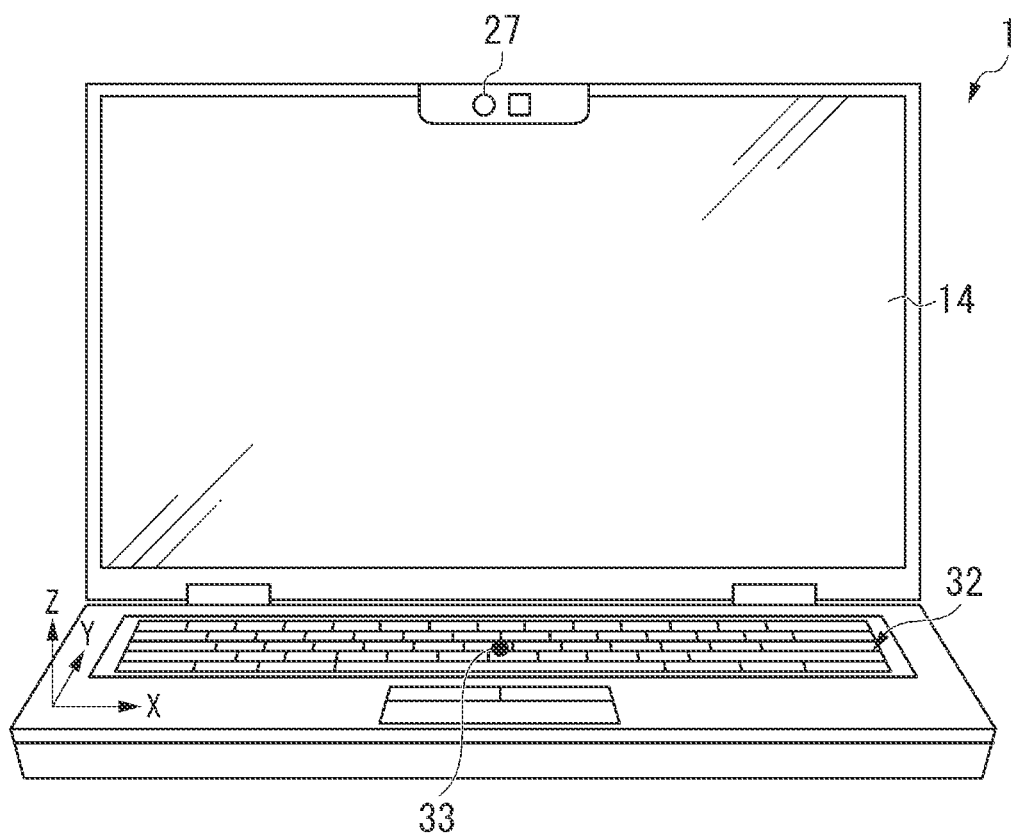
FIG. 1 is an external view illustrating one example of a laptop PC according to one embodiment of the present invention.
Figure 2:
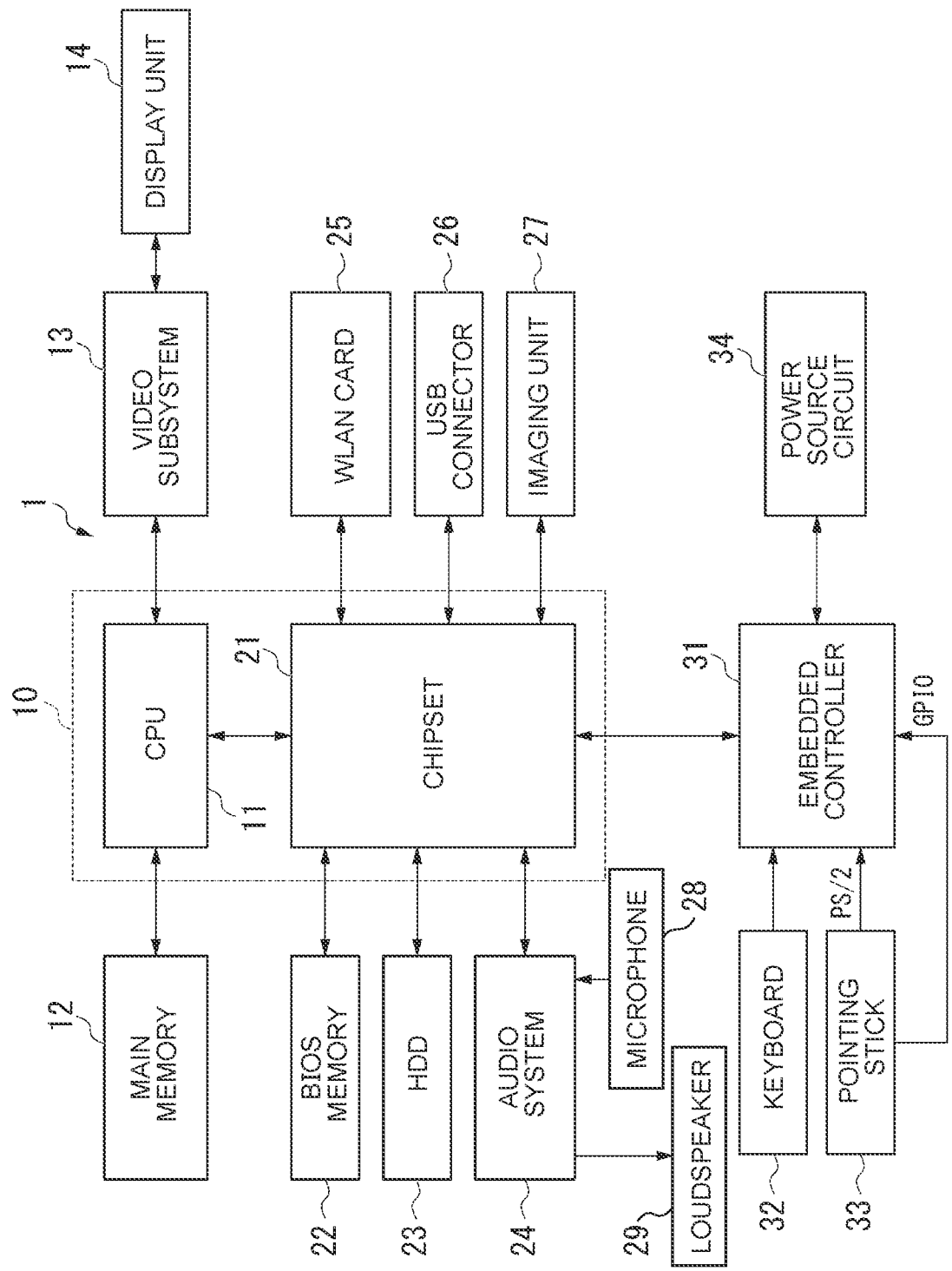
FIG. 2 is a diagram illustrating one example of a main hardware configuration of the laptop PC according to one embodiment of the present invention.

FIG. 1 is an external view illustrating one example of a laptop PC 1 according to one embodiment of the present invention. In addition, FIG. 2 is a diagram illustrating one example of a main hardware configuration of the laptop PC 1 according to one embodiment of the present invention. Incidentally, in one embodiment of the present invention, the Laptop PC (Personal Computer) 1 will be described as one example of the information processing apparatus.

As illustrated in FIG. 1, the laptop PC 1 is a notebook type personal computer and includes a display unit 14, an imaging unit 27, a keyboard 32 and a pointing stick 33.

In addition, as illustrated in FIG. 2, the laptop PC 1 also includes a CPU (Central Processing Unit) 11, a main memory 12, a video subsystem 13, a chipset 21, a BIOS (Basic Input Output System) memory 22, an HDD (Hard Disk Drive) 23, an audio system 24, a WLAN (Wireless Local Area Network) card 25, a USB (Universal Serial Bus) connector 26, a microphone 28, a loudspeaker 29, an embedded controller 31 and a power source circuit 34, in addition to the display unit 14, the imaging unit 27, the keyboard 32 and the pointing stick 33.

The CPU 11 executes various kinds of arithmetic processing under program control and controls the entire operation of the entire laptop PC 1.

The main memory 12 is a writable memory which is utilized as an area into which an execution program of the CPU 11 is read or as a work area into which processing data of the execution program is written. The main memory 12 is configured by, for example, a plurality of DRAM (Dynamic Random Access Memory) chips. An OS (Operating System), various device drivers for operating peripherals in hardware, various services/utilities, application programs and so forth are contained in this execution program.

The video subsystem 13 is a subsystem for realizing a function which relates to image display and includes a video controller. The video controller processes a drawing command which is issued from the CPU 11, writes drawing information which is processed into a video memory and then reads the processed drawing information out of the video memory and outputs the read-out drawing information to the display unit 14 as drawing data (display data).

The display unit 14 is, for example, a liquid crystal display, an organic EL (Electro-Luminescence) display and so forth and displays a display screen which is based on the drawing data (the display data) which is output from the video system 13.

The chip set 21 includes controllers for a USB (Universal Serial Bus) bus, a serial ATA (Advanced Technology Attachment) bus, an SPI (Serial Peripheral Interface) bus, a PCI (Peripheral Component Interconnect) bus, a PCI-Express bus, an LPC (Low Pin Count) bus and so forth and a plurality of devices is connected to the chip set 21 via these buses. In the example in FIG. 2, the BIOS memory 22, the HDD 23, the audio system 24, the WLAN card 25, the USB connector 26, the imaging unit 27 and the embedded controller 31 are connected to the chip set 21 via the above buses as illustrative examples of the devices.

Incidentally, in one embodiment of the present invention, a functional unit which is realized by the CPU 11 and the chip set 21 will be described as the main control unit 10.

The BIOS memory 22 is configured by an electrically rewritable nonvolatile memory such as, for example, an EEPROM (Electrically Erasable Programmable Read Only Memory), a flash ROM and so forth. The BIOS memory 22 stores system firmware and so forth for controlling the operations of the BIOS, the embedded controller 31 and so forth.

The HDD 23 stores the OS, the various device drivers, the various services/utilities, application programs and various data.

The audio system 24 records, reproduces and outputs sound data. For example, the microphone 28 and the loudspeaker 29 are connected to the audio system 24.

The WLAN card 25 is connected to a network such as a wireless LAN and so forth and performs data communication with the network. For example, in a case where the WLAN card 25 receives data from the network, the WLAN card 25 generates an event trigger which indicates data reception.

The USB connector 26 is a connector which is adapted to connect the peripherals to the Laptop PC 1 via the USB bus.

The imaging unit 27 is a digital camera which includes, for example, a CCD (Charge Coupled Devices) image sensor, a CMOS (Complementary Metal Oxide Semiconductor) image sensor and so forth and is disposed on an upper part of the display unit 14.

The microphone 28 is a built-in microphone and acquires sounds around the Laptop PC 1 and outputs a sound signal to the audio system 24.

The loudspeaker 29 is a built-in loudspeaker and converts the sound signal which is output from the audio system 24 to the sound and outputs the sound to the outside.

The embedded controller 31 is a One-Chip Microcomputer which monitors and controls the operations of various devices (the peripherals, sensors and so forth) regardless of the system state of the Laptop PC 1. In addition, the embedded controller 31 has a power source management function for controlling the operation of the power source circuit 34. Incidentally, the embedded controller 31 is configured by not-illustrated CPU, ROM, RAM and so forth and includes A/D input terminals, D/A output terminals, timers and digital input and output terminals for a plurality of channels. For example, the keyboard 32, the pointing stick 33, the power source circuit 34 and so forth are connected to the embedded controller 31 via the above-described input and output terminals and the embedded controller 31 controls the operations of the keyboard 32, the pointing stick 33, the power source circuit 34 and so forth.

The keyboard 32 is, for example, a built-in keyboard and accepts a key-input operation from a user. The keyboard 32 is connected with the embedded controller 31 via, for example, a PS/2 port.

The pointing stick 33 is a pointing device which is disposed on a central portion of the keyboard 32 and has an operable stick (not illustrated). The pointing stick 33 has a piezoelectric element (for example, a piezo element) which deforms by being caused by a displacement of the stick and it is possible for the pointing stick 33 to detect a displacement in a stick installation plane direction (a displacement in an XY axial plane direction which is illustrated in FIG. 1) and a displacement in a direction which is vertical to the stick installation plane (in a Z-axis direction which is illustrated in FIG. 1) by using the piezoelectric element (for example, the piezo element).

The pointing stick 33 outputs information (plane displacement information) which indicates the displacement in the installation plane direction (the displacement in the XY axial direction which is illustrated in FIG. 1) to the embedded controller 31 via the PS/2 port (a first interface).

In addition, the pointing stick 33 outputs information which indicates the displacement in the vertical direction (the Z-axis direction which is illustrated in FIG. 1) to the embedded controller 31 via a GPIO port. For example, the pointing stick 33 outputs a detection signal which indicates that the pointing stick 33 detects a specific operation (for example, a double-tap operation) to the embedded controller 31 via the GPIO port. Incidentally, the double-tap operation is an operation of depressing the stick two times in a short period of time in the Z-axis direction, that is, the operation of depressing the stick two times in the vertical direction. The double-tap operation is one example of the specific operation which involves the displacement in the Z-axis direction.

In a case where the pointing stick 33 detects a first-time tap operation in a situation where the initial state of the GPIO port is a High state, the pointing stick 33 brings the GPIO port to a Low state and outputs detection of the first-time tap operation to the embedded controller 31. In addition, in a case where the pointing stick 33 detects a second-time tap operation, the pointing stick 33 brings the GPIO port to the High state and outputs detection of the second-time tap operation to the embedded controller 31. The pointing stick 33 outputs detection of the double-tap operation to the embedded controller 31 by using a toggle signal.

The power source circuit 34 includes, for example, a DC/DC converter, a charge/discharge unit, a battery unit, an AC/DC adapter and so forth and converts a DC voltage which is supplied from the AC/DC adapter or the battery unit to a plurality of voltages which is necessary to operate the Laptop PC 1. In addition, the power source circuit 34 supplies electric power to respective units of the Laptop PC 1 on the basis of the control from the embedded controller 31.

Next, a functional configuration of the Laptop PC 1 according to one embodiment of the present invention will be described with reference to FIG. 3.

Figure 3:
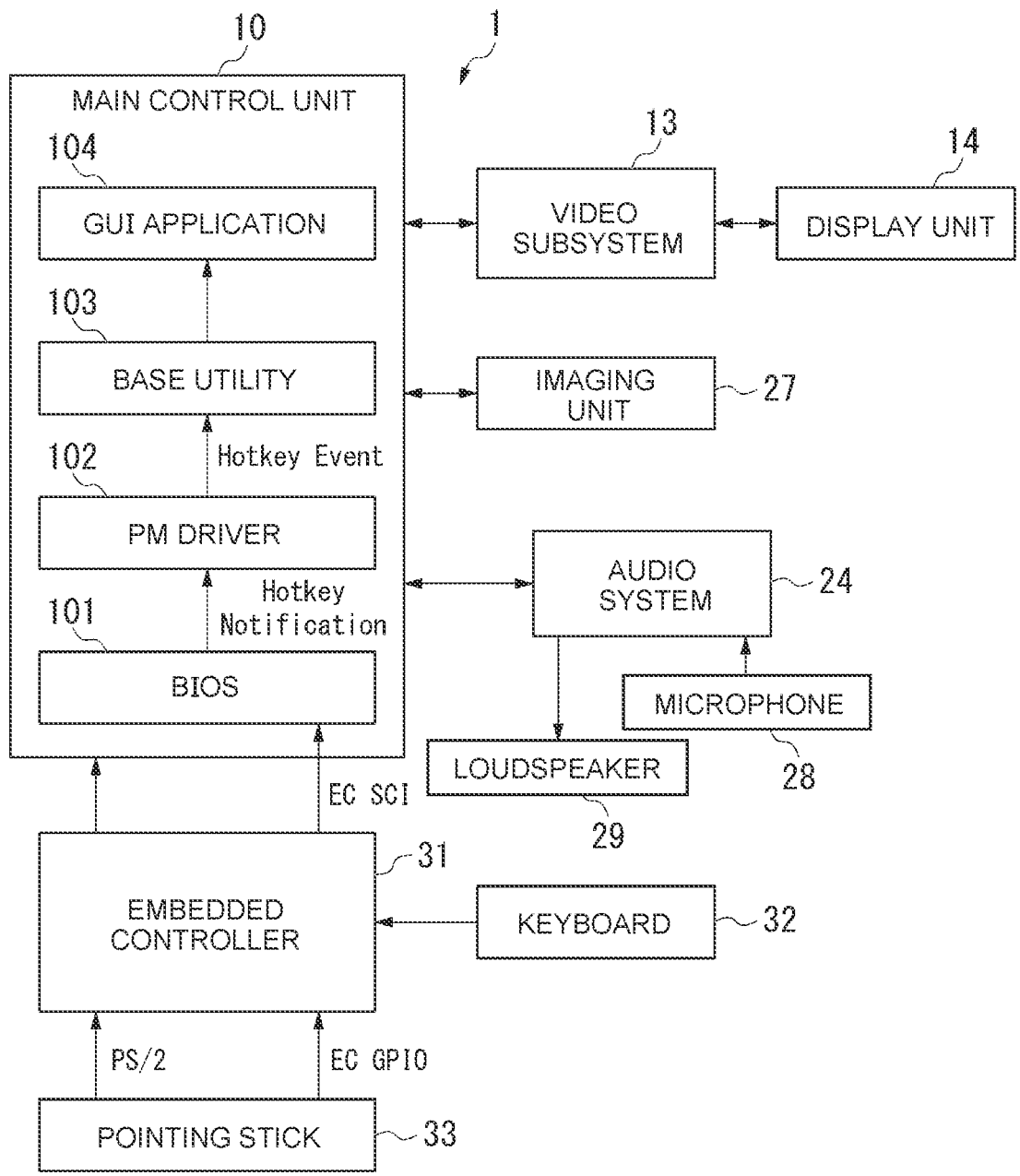
FIG. 3 is a block diagram illustrating one example of a functional configuration of the laptop PC according to one embodiment of the present invention.

FIG. 3 is a block diagram illustrating one example of the functional configuration of the Laptop PC 1 according to one embodiment of the present invention.

As illustrated in FIG. 3, the Laptop PC 1 includes a main control unit 10, the video subsystem 13, the display unit 14, the audio system 24, the imaging unit 27, the microphone 28, the loudspeaker 29, the embedded controller 31, the keyboard 32 and the pointing stick 33.

The embedded controller 31 (a sub-control unit) receives the plane displacement information which indicates the displacement in the installation plane direction that the pointing stick 33 detects via the PS/2 port (the first interface) and transmits the received plane displacement information to the main control unit 10. In addition, the embedded controller 31 receives such a notification that the pointing stick 33 detects the double-tap operation (the specific operation) via the GPIO port (the second interface) and transmits event information which indicates detection of the double-tap operation to the main control unit 10. Here, the event information is, for example, SCI (System Control Interrupt) information.

Figure 4:
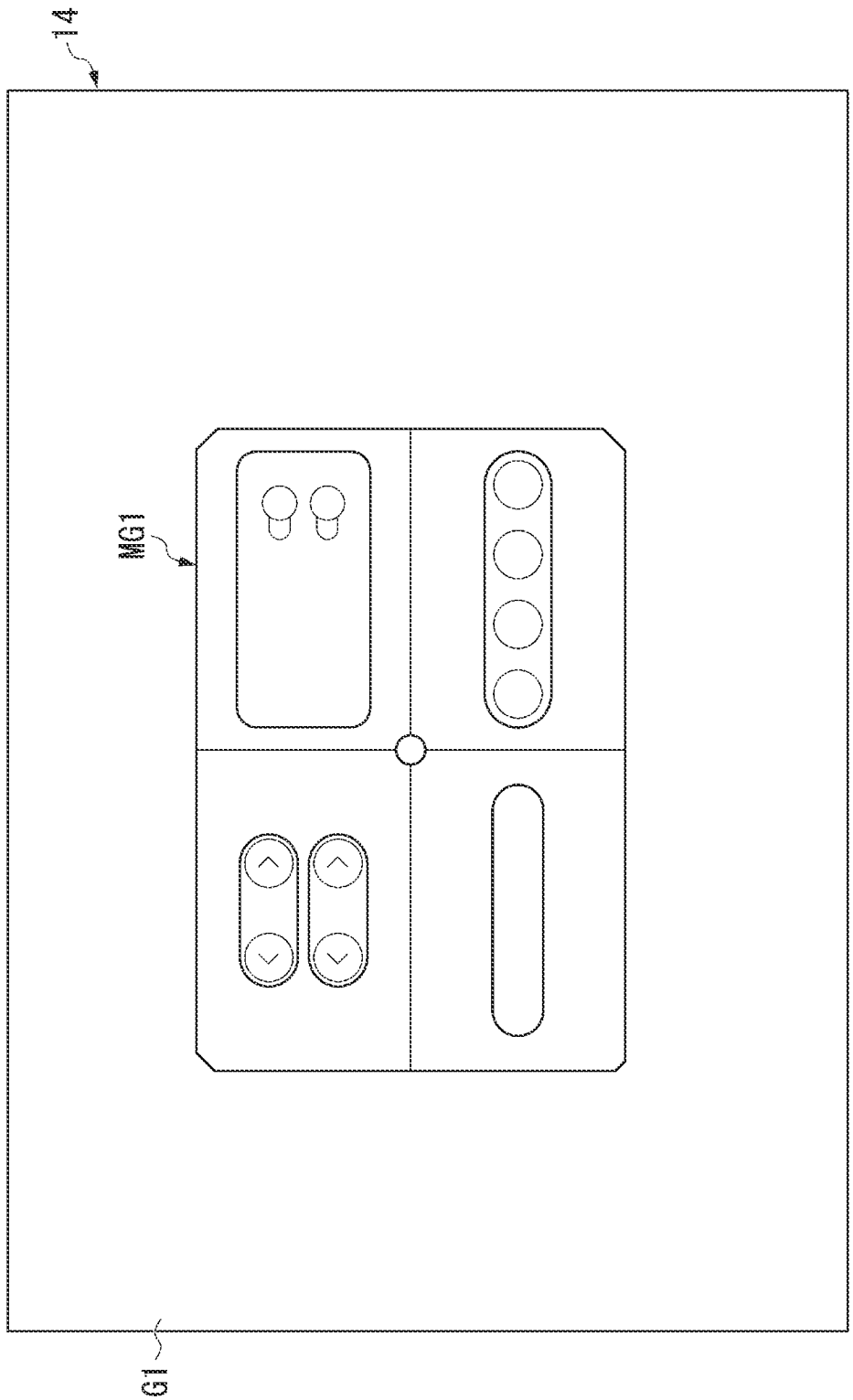
FIG. 4 is a diagram illustrating one display example of a settings menu screen in one embodiment of the present invention.

The main control unit 10 is a function unit which is realized by the CPU 11 and the chipset 21. In a case where the pointing stick 33 detects the double-tap operation (the specific operation), the main control unit 10 displays a menu screen which is previously determined on the display unit 14. Here, the menu screen is a screen which is displayed in a display screen of the display unit 14 such as, for example, OSD (On Screen Display) and is a settings menu screen which is used for setting change such as that which is illustrated in FIG. 4. Here, one example of the menu screen will be described with reference to FIG. 4.

FIG. 4 is a diagram illustrating one display example of the settings menu screen MG 1.

As illustrated in FIG. 4, the settings menu screen MG 1 is displayed in a display screen G1 of the display unit 14. Incidentally, for example, settings of a luminance and a contrast of the imaging unit 27, settings of the audio system 24 (the microphone 28 and the loudspeaker 29), a setting of a mute function and so forth may be configured on the settings menu screen MG 1. In the settings menu screen MG 1, the menu screen is a screen which indicates a menu for changing the setting of the input device or the output device.

For example, in the example of the settings menu screen MG 1 which is illustrated in FIG. 4, it may be possible to change the settings of the luminance and the contrast of the imaging unit 27, the setting of the microphone 28, the setting of the mute function, a setting of a Dictation tool bar (the setting of voice recognition) and so forth. In one embodiment of the present invention, in a case where the double-tap operation is performed on the pointing stick 33, the Laptop PC 1 displays a menu screen such as the settings menu screen MG 1 and so forth on the display unit 14.

Returning to the description in FIG. 3, the main control unit 10 includes a BIOS 101, a PM driver (Power Management Driver) 102, a base utility 103 and a GUI (Graphical User Interface) application 104.

The BIOS 101 is a function unit which is realized by reading a BIOS program which is stored in the BIOS memory 22 into the main memory 12 and executing the BIOS program by the CPU 11. The BIOS 101 receives event information which indicates detection of the double-tap operation on the basis of the SCI which is sent from the embedded controller 31 and outputs the event information to the PM driver 102 as a notification of a hotkey.

The PM driver 102 is a function unit which is realized by reading a program which is stored in the HDD 23 into the main memory 12 and executing the program by the CPU 11. The PM driver 102 is a device driver which mainly performs management which relates to electric power saving of the Laptop PC 1 and receives the notification of the hotkey from the BIOS 101 and notifies the base utility 103 of information that the pointing stick 33 detects the double-tap operation from the event of the hotkey in accordance with the notification of the hotkey.

The base utility 103 (one example of a utility processing unit) is a function unit which is realized by reading the program which is stored in the HDD 23 into the main memory 12 and executing the program by the CPU 11. Incidentally, the base utility 103 is the utility which operates on the OS. The base utility 103 senses that the pointing stick 33 detects the double-tap operation from the event of the hotkey. In a case where the base utility 103 receives the event of the hotkey from the PM driver 102, the base utility 103 outputs a notification for requesting to display the settings menu screen MG 1 (a request to display the settings menu screen MG 1) to the GUI application 104.

The GUI application 104 (a GUI processing unit) is a function unit which is realized by reading the program which is stored in the HDD 23 into the main memory 12 and executing the program by the CPU 11. Incidentally, the GUI application 104 is the application which operates on the OS and is the application which displays the settings menu screen MG 1 such as that which is illustrated in FIG. 3 and changes the setting of each device (the input device or the output device).

In a case where the base utility 103 receives the event of the hotkey, the GUI application 104 displays the settings menu screen MG 1 on the display unit 14. For example, in a case where the GUI application 104 receives the notification for requesting to display the settings menu screen MG 1 (the request to display the settings menu screen MG 1) from the base utility 103, the GUI application 104 displays, for example, the settings menu screen MG 1 which is illustrated in FIG. 3 on the display unit 14.

In addition, after display of the settings menu screen MG 1, the GUI application 104 accepts a request to change the setting of the menu screen via the keyboard 32 and the pointing stick 33 and executes changing of various settings. Incidentally, a state where the settings menu screen MG 1 is displayed is called a menu screen displayed state.

In addition, in a case where an out-of-area part of the settings menu screen MG 1 is clicked or in a case where a display-off button in the area of the settings menu screen MG 1 is clicked, the GUI application 104 transitions the state to a hidden state where the settings menu screen MG 1 is not displayed on the display unit 14. For example, in a case where the user moves the pointer to the out-of-area part of the settings menu screen MG 1 via the pointing stick 33 and clicks the out-of-area part of the settings menu screen MG 1, the GUI application 104 shifts the state to the hidden state where the settings menu screen MG 1 is hidden (not displayed), the menu is hidden and execution of processing by the GUI application 104 is permitted (a menu hidden/ GUI permitted state). In addition, also in a case where, for example, the user clicks the display-off button such as "x" and so forth on the window in the settings menu screen MG 1, the GUI application 104 shifts the state to the menu hidden/GUI permitted state.

In addition, in a case where the GUI application 104 detects inputting of a specific combination of a plurality of keys which includes a modifier key via the keyboard 32 in the permitted state where execution of display processing on the settings menu screen MG 1 is permitted, the GUI application 104 ignores detection of a specific operation and transitions the state to a prohibited state where execution of the menu screen display processing is prohibited. Here, the inputting of the specific combination of the plurality of keys which includes the modifier key is, for example, combined depressing of the "Fn" key and the "G" key (depressing of the "Fn" key+ the "G" key). In a case where the depressing of the "Fn" key+ the "G" key is detected, for example, in a menu screen displayed state or the menu hidden/GUI permitted state, the GUI application 104 shifts the state to a GUI prohibited state. The GUI prohibited state is one example of the prohibited state where execution of the menu screen display processing is prohibited.

In the GUI prohibited state, in a case where the GUI application 104 receives a request to display the settings menu screen MG 1 from the base utility 103, the GUI application 104 ignores the display request and does not execute display of the settings menu screen MG 1.

In addition, in the GUI prohibited state, in a case where the GUI application 104 detects inputting of the specific combination of the keys via the keyboard 32 (in the case where depressing of the "Fn" key+ the "G" key is detected), the GUI application 104 transitions the state to the permitted state (for example, the menu hidden/GUI permitted state).

Next, the state transition by the GUI application 104 will be described with reference to FIG. 5.

Figure 5:
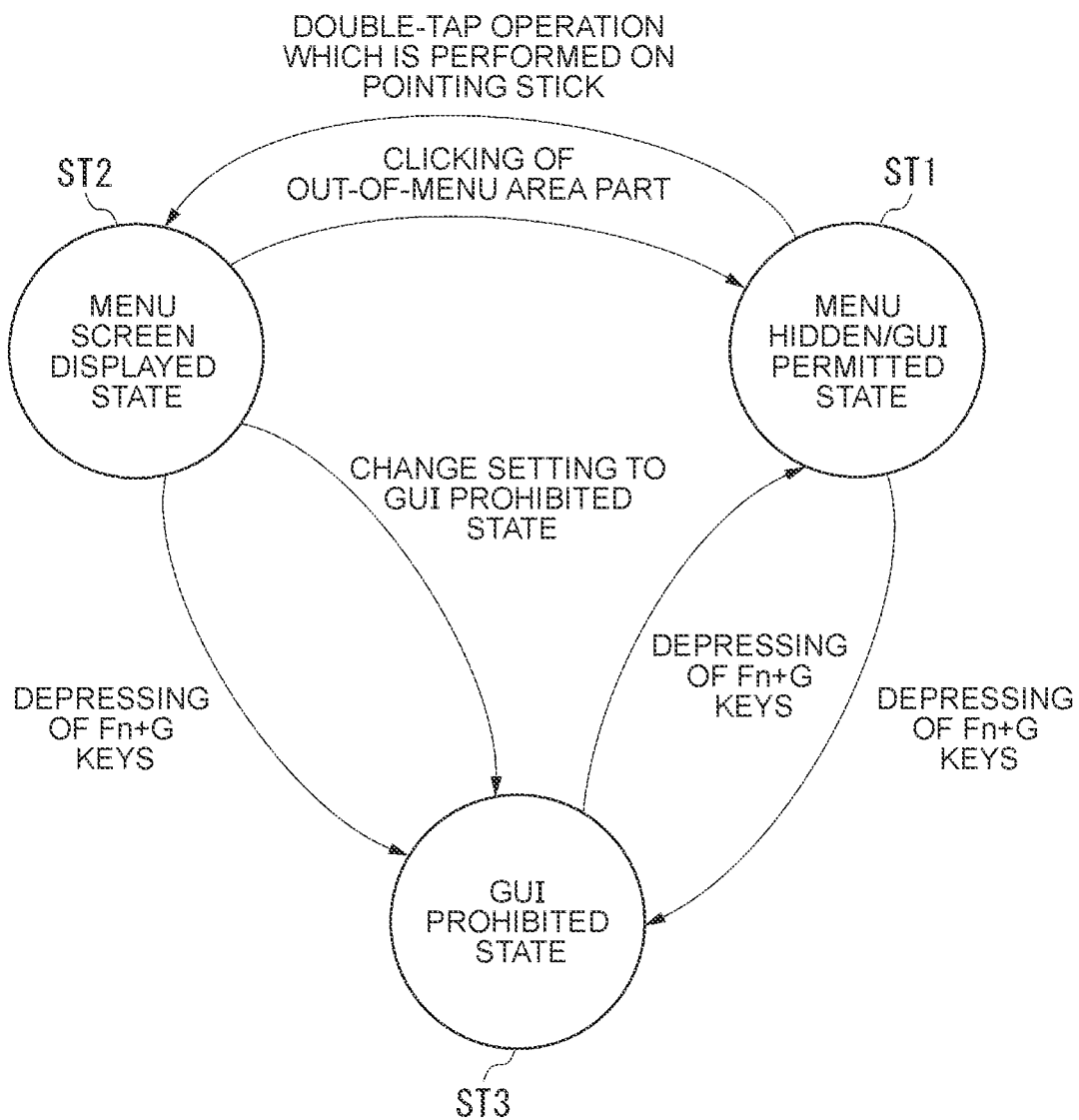
FIG. 5 is a diagram illustrating one example of state transition of the laptop PC according to one embodiment of the present invention.

FIG. 5 is a diagram illustrating one example of the state transition of the Laptop PC 1 according to one embodiment of the present invention. Here, the state transition by the GUI application 104 will be described.

As illustrated in FIG. 5, in the GUI application 104, three states, that is, a menu hidden/GUI permitted state ST 1, a menu screen displayed state ST 2 and a GUI prohibited state ST 3 are set.

The menu hidden/GUI permitted state ST 1 (one example of the permitted state) is a state where shifting (transition) from the menu screen hidden state to the menu screen displayed state ST 2 is permitted. In a case where in the menu hidden/GUI permitted state ST 1, the double-tap operation of the pointing stick 33 is detected, the GUI application 104 transitions the state to the menu screen displayed state ST 2. In addition, in a case where in the menu hidden/GUI permitted state ST 1, the depressing of the "Fn" key+ the "G" key is detected, the GUI application 104 transitions the state to the GUI prohibited state ST 3.

The menu screen displayed state ST 2 (one example of the permitted state) is a state where the settings menu screen MG 1 such as that which is illustrated in FIG. 4 is displayed. In a case where in the menu screen displayed state ST 2, clicking of the out-of-menu area part is detected, the GUI application 104 transitions the state to the menu hidden/GUI permitted state ST 1.

In addition, in a case where in the menu screen displayed state ST 2, the depressing of the "Fn" key+ the "G" key is detected, the GUI application 104 brings the settings menu screen MG 1 to the hidden state and transitions the state to the GUI prohibited state ST 3.

In addition, in the menu screen displayed state ST 2, for example, in a case where the setting is changed to the GUI prohibited state ST 3 on the settings menu screen MG 1, the GUI application 104 brings the settings menu screen MG 1 to the hidden state and transitions the state to the GUI prohibited state ST 3.

The GUI prohibited state ST 3 (one example of the prohibited state) is a state where the GUI application 104 does not accept the request to display the settings menu screen MG 1 by the double-tap operation which is performed on the pointing stick 33. In a case where in the GUI prohibited state ST 3, the depressing of the "Fn" key+ the "G" key is detected, the GUI application 104 transitions the state to the menu hidden/GUI permitted state ST 1.

Next, operations of the Laptop PC 1 according to one embodiment of the present invention will be described with reference to the drawings.

Figure 6:
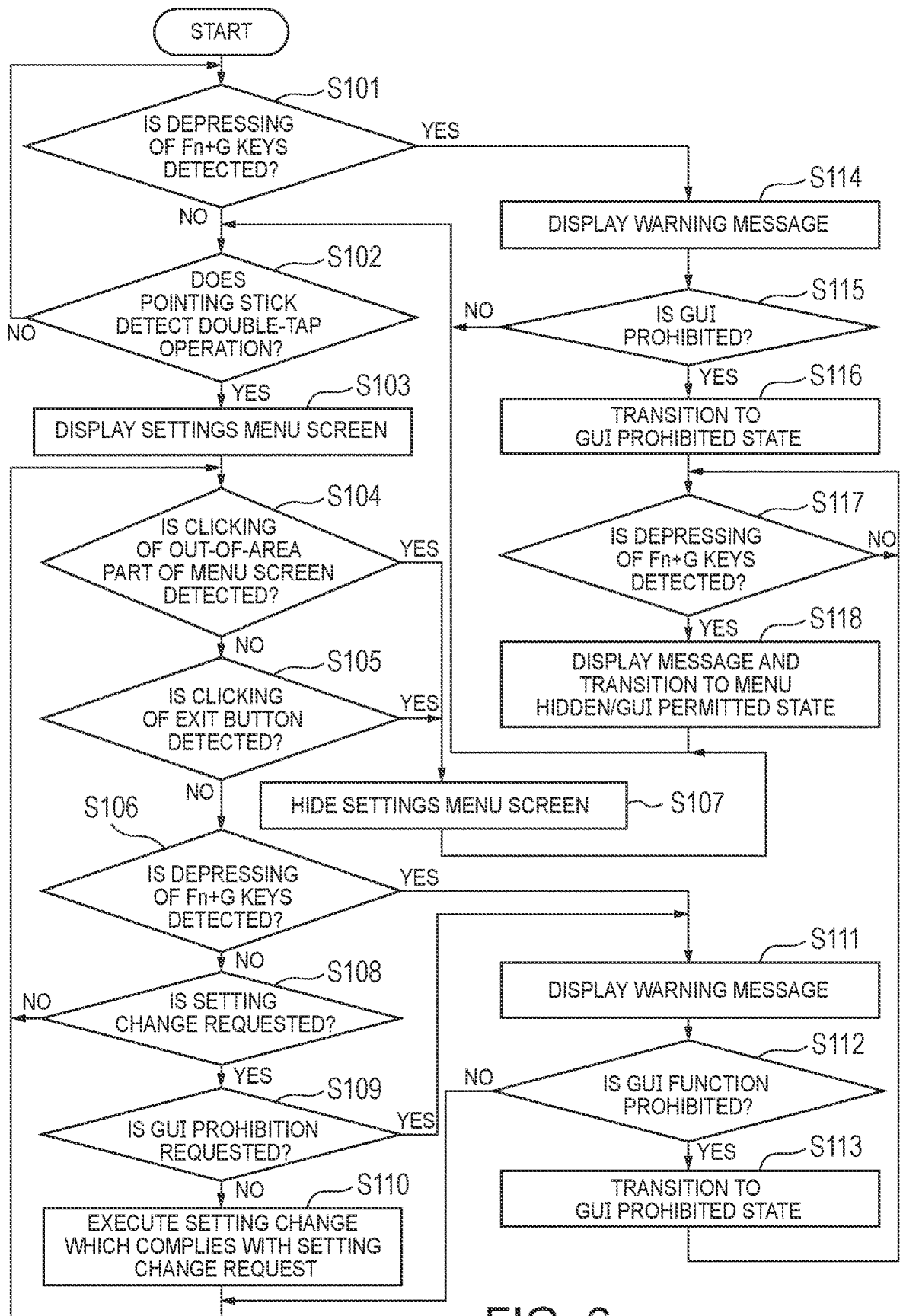
FIG. 6 is a flowchart illustrating one example of operations of the laptop PC according to one embodiment of the present invention.

FIG. 6 is a flowchart illustrating one example of the operations of the Laptop PC 1 according to one embodiment of the present invention. Here, setting change processing which is executed by utilizing the pointing stick 33 of the Laptop PC 1 will be described.

As illustrated in FIG. 6, first, the Laptop PC 1 decides whether the depressing of the "Fn" key+ the "G" key is detected (step S101). Incidentally, the initial state is the menu hidden/GUI permitted state ST 1 which is illustrated in FIG. 5. The GUI application 104 of the Laptop PC 1 decides whether the depressing of the "Fn" key+ the "G" key which is performed via the keyboard 32 is detected. In a case where the depressing of the "Fn" key+ the "G" key which is performed via the keyboard 32 is detected (step S101: YES), the GUI application 104 proceeds the process to step S114. On the other hand, in a case where the depressing of the "Fn" key+ the "G" key which is performed via the keyboard 32 is not detected (step S101: NO), the GUI application 104 proceeds the process to step S102.

In step S102, the GUI application 104 decides whether the pointing stick 33 detects the double-tap operation. The pointing stick 33 notifies the embedded controller 31 of detection of the double-tap operation via the GPIO port and the embedded controller 31 notifies the BIOS 101 of the detection of the double-tap operation by using the SCI as the event information. In addition, the BIOS 101 outputs the detection of the double-tap operation to the PM driver 102 as a notification which responds to the SCI which indicates detection of the double-tap operation. The PM driver 102 outputs an event of the hotkey which indicates the detection of the double-tap operation to the base utility 103. The base utility 103 outputs the request to display the settings menu screen MG 1 to the GUI application 104 in accordance with the event of the hotkey. The GUI application 104 senses that the pointing stick 33 detects the double-tap operation which is performed on itself from issuance of the request to display the settings menu screen MG 1.

In a case where the pointing stick 33 detects the double-tap operation (step S102: YES), the GUI application 104 proceeds the process to step S103. On the other hand, in a case where the pointing stick 33 does not detect the double-tap operation (step S102: NO), the GUI application 104 returns the process to step S101.

In step S103, the GUI application 104 displays the settings menu screen MG 1. The GUI application 104 makes the display unit 14 display the settings menu screen MG 1 such as the screen which is illustrated in FIG. 4 via the video subsystem 13. Incidentally, thereby, the GUI application 104 enters the menu screen displayed state ST 2 which is illustrated in FIG. 5.

Then, the GUI application 104 decides whether clicking of the out-of-area part of the settings menu screen MG 1 is detected (step S104). The GUI application 104 decides whether the pointer is moved to the out-of-area part of the settings menu screen MG 1 and the out-of-area part is clicked by using the pointing stick 33. In a case where the GUI application 104 detects the clicking of the out-of-area part of the settings menu screen MG 1 (step S104: YES), the GUI application 104 proceeds the process to step S107. On the other hand, in a case where the GUI application 104 does not detect the clicking of the out-of-area part of the settings menu screen MG 1 (step S104: NO), the GUI application 104 proceeds the process to step S105.

In step S105, the GUI application 104 decides whether clicking of the exit button is detected. The GUI application 104 decides whether the pointer is moved to the exit button and the exit button is clicked by using the pointing stick 33. In a case where the GUI application 104 detects the clicking of the exit button (step S105: YES), the GUI application 104 proceeds the process to step S107. On the other hand, in a case where the GUI application 104 does not detect the clicking of the exit button (step S105: NO), the GUI application 104 proceeds the process to step S106.

In step S106, the GUI application 104 decides whether depressing of the "Fn" key+ the "G" key is detected. That is, the GUI application 104 decides whether the depressing of the "Fn" key+ the "G" key is detected via the keyboard 32. In a case where the depressing of the "Fn" key+ the "G" key is detected via the keyboard 32 (step S106: YES), the GUI application 104 proceeds the process to step S111. On the other hand, in a case where the depressing of the "Fn" key+ the "G" key is not detected via the keyboard 32 (step S106: NO), the GUI application 104 proceeds the process to step S108.

In addition, in step S107, the GUI application 104 hides the settings menu screen MG 1. That is, the GUI application 104 hides the settings menu screen MG 1 and brings the state to the menu hidden/GUI permitted state ST 1 which is illustrated in FIG. 5. After execution of the process in step S107, the GUI application 104 returns the process to step S101.

In addition, in step S108, the GUI application 104 decides whether change of the settings is requested. The GUI application 104 decides whether the change of the settings which are displayed in the settings menu screen MG 1 is requested via the keyboard 32 and the pointing stick 33. In a case where the change of the settings is requested (step S108: YES), the GUI application 104 proceeds the process to step S109. On the other hand, in a case where the change of the settings is not requested (step S108: NO), the GUI application 104 returns the process to step S104.

In step S109, the GUI application 104 decides whether the request to change the settings is a request to prohibit the GUI. In a case where the request to change the settings is the request to prohibit the GUI (step S109: YES), the GUI application 104 proceeds the process to step S111. On the other hand, in a case where the request to change the settings is not the request to prohibit the GUI (step S109: NO), the GUI application 104 proceeds the process to step S110.

In step S110, the GUI application 104 executes a setting change which complies with the request to change the settings. The GUI application 104 executes changing of, for example, the settings of the luminance and the contrast of the imaging unit 27, the setting of the microphone 28, the setting of the mute function, the setting of a Dictation tool bar (the setting of voice recognition) and so forth in accordance with the request to change the settings. After execution of the process in step S110, the GUI application 104 returns the process to step S104.

In addition, in step S111, the GUI application 104 displays a warning message. That is, the GUI application 104 displays a message which indicates that execution of a display function of the settings menu screen MG 1 by the double-tap operation will be prohibited on the display unit 14, for example, in the form of a pop-up message or an OSD (On-Screen Display).

Next, the GUI application 104 decides whether execution of a GUI function is to be prohibited (step S112). The GUI application 104 decides whether inputting which admits prohibition of the function of displaying the settings menu screen MG 1 is detected, for example, via the keyboard 32 or the pointing stick 33. In a case where the GUI application 104 admits prohibition of execution of the GUI function (the function of displaying the settings menu screen MG 1) (step S112: YES), the GUI application 104 proceeds the process to step S113. On the other hand, in a case where the GUI application 104 does not admit prohibition of execution of the GUI function (step S112: NO), the GUI application 104 returns the process to step S104.

In step S113, the GUI application 104 transitions the state to the GUI prohibited state ST 3. That is, the GUI application 104 hides display of the settings menu screen MG 1 and transitions the state to the GUI prohibited state ST3. After execution of the process in step S113, the GUI application 104 proceeds the process to step S117.

In addition, in step S114, the GUI application 104 displays a warning message. That is, the GUI application 104 displays the message that execution of the function of displaying the settings menu screen MG 1 by the double-tap operation will be prohibited in the form of, for example, the pop-up message or the OSD.

Next, the GUI application 104 decides whether execution of the GUI function is to be prohibited (step S115). In a case where the GUI application 104 admits prohibition of execution of the GUI function (step S115: YES), the GUI application 104 proceeds the process to step S116. On the other hand, in a case where the GUI application 104 does not admit prohibition of execution of the GUI function (step S115: NO), the GUI application 104 returns the process to step S102.

In step S116, the GUI application 104 transitions the state to the GUI prohibited state ST 3. That is, the GUI application 104 hides the display of the settings menu screen MG 1 and transitions the state to the GUI prohibited state ST 3.

Next, the GUI application 104 decides whether the depressing of the "Fn" key+ the "G" key is detected (step S117). That is, the GUI application 104 decides whether the depressing of the "Fn" key+ the "G" key is detected via the keyboard 32. In a case where the depressing of the "Fn" key+ the "G" key is detected via the keyboard 32 (step S117: YES), the GUI application 104 proceeds the process to step S118. On the other hand, in a case where the depressing of the "Fn" key+ the "G" key is not detected via the keyboard 32 (step S117: NO), the GUI application 104 returns the process to step S117.

In step S118, the GUI application 104 displays the message and transitions the state to the menu hidden/GUI permitted state ST 1. The GUI application 104 displays a message that execution of the function of displaying the settings menu screen MG 1 by the double-tap operation will be permitted on the display unit 14 in the form of, for example, the pop-up message or the OSD and transitions the state to the menu hidden/GUI permitted state ST 1. After execution of the process in step S118, the GUI application 104 returns the process to step S102.

As described above, the Laptop PC 1 (the information processing apparatus) according to one embodiment of the present invention has the pointing stick 33 and the main control unit 10. The pointing stick 33 is disposed on the keyboard 32, has the operable stick and makes it possible to detect the displacement in the direction (the Z-axis direction) which is vertical to the installation plane, together with the displacements in the stick installation plane directions (the X-axis and Y-axis plane directions). In a case where the pointing stick 33 detects the specific operation (for example, the double-tap operation which is performed on the pointing stick 33) which includes the displacement in the vertical direction of the stick, the main control unit 10 displays the previously determined menu screen (for example, the settings menu screen MG 1) on the display unit 14.

Thereby, it becomes possible for the Laptop PC 1 according to one embodiment of the present invention to promptly display the menu screen (for example, the settings menu screen MG 1) by execution of the specific operation (for example, the double-tap operation which is performed on the bonding stick 33). Therefore, it becomes possible for the Laptop PC 1 to realize a user interface which utilizes the pointing stick 33 and is high in usability. In addition, it becomes possible for the Laptop PC 1 according to one embodiment of the present invention to realize a novel user interface which utilizes the pointing stick 33.

In addition, the Laptop PC 1 according to one embodiment of the present invention includes the embedded controller 31 (the sub control unit). The embedded controller 31 receives the plane displacement information which indicates the displacement in the installation plane direction that the pointing stick 33 detects via the first interface (for example, the serial interface such as the PS/2 port and so forth) and transmits the received plane displacement information to the main control unit 10. In addition, the embedded controller 31 receives such a notification that the pointing stick 33 detects the specific operation (for example, the double-tap operation) which is performed on the pointing stick 33 via the second interface (for example, the GPIO port) and notifies the main control unit 10 of event information for notification of detection of the specific operation.

Thereby, it becomes possible for the Laptop PC 1 according to one embodiment of the present invention to realize the novel user interface which utilizes the pointing stick 33 by addition of a simple element which uses the second interface (for example, the GPIO port) while effectively utilizing the existing system. That is, it becomes for the Laptop PC 1 according to one embodiment of the present invention to improve convenience by the simple element while maintaining compatibility with the existing system.

In addition, in one embodiment of the present invention, the specific operation is the double-tap operation of depressing the stick two times in the vertical direction (the Z-axis direction). In a case where the pointing stick 33 detects the double-tap operation, the main control unit 10 displays the settings menu screen MG 1 on the display unit 14.

Thereby, it becomes possible for the Laptop PC 1 according to one embodiment of the present invention to display the settings menu screen MG 1 on the display unit 14 by the simple operation which is called the double-tap operation and is performed on the pointing stick 33.

In addition, in one embodiment of the present invention, the main control unit 10 includes the base utility 103 (the utility processing unit) and the GUI application 104 (the GUI processing unit). That is, the main control unit 10 controls a process that the base utility 103 executes and a process that the pointing stick 33 executes. The base utility 103 executes the process of sensing that the pointing stick 33 detects the specific operation which is performed on itself in response to an event of the hotkey. In a case where the base utility 103 receives the event of the hotkey, the GUI application 104 executes the process of displaying the menu screen on the display unit 14.

Thereby, it becomes possible for the Laptop PC 1 according to one embodiment of the present invention to realize the novel user interface which utilizes the pointing stick 33 by a simple configuration while effectively utilizing the existing system by using the event of the hotkey.

In addition, in one embodiment of the present invention, in the case where the out-of-area part of the settings menu screen MG 1 is clicked or in the case where the display exit button in the area of the settings menu screen MG 1 is clicked, the GUI application 104 transitions the state to the hidden state (the menu hidden/GUI permitted state ST 1 which is illustrated in FIG. 5) that the settings menu screen MG 1 is not displayed on the display unit 14.

Thereby, it becomes possible for the laptop PC 1 according to one embodiment of the present invention to bring the settings menu screen MG 1 which is displayed to the hidden state with ease and to improve the convenience.

In addition, in one embodiment of the present invention, in a case where the GUI application 104 detects inputting of the specific combination of the plurality of keys including the modifier key which is performed via the keyboard 32 in the permitted state (for example, the menu hidden/GUI permitted state ST 1 or the menu screen displayed state ST 2 which are illustrated in FIG. 5) where execution of the process of displaying the settings menu screen MG 1 is permitted, the GUI application 104 ignores the detection of the specific operation and transitions the state to the prohibited state (for example, the GUI prohibited state ST 3 which is illustrated in FIG. 5) where execution of the process of displaying the menu screen is prohibited. In addition, in a case where the GUI application 104 detects the inputting of the specific combination of the plurality of keys including the modifier key which is performed via the keyboard 32 in the prohibited state (for example, the GUI prohibited state ST 3 which is illustrated in FIG. 5), the GUI application 104 transitions the state to the permitted state. Here, the inputting of the specific combination of the plurality of keys including the modifier key which is performed via the keyboard 32 is, for example, the depressing of the "Fn" key+ the "G" \key. In addition, for example, the "Ctrl" key, the "Alt" key and so forth are contained in the modifier key in addition to the "Fn" key.

Thereby, it becomes possible for the Laptop PC 1 according to one embodiment of the present invention to prohibit or permit with ease execution of the function of displaying the settings menu screen MG 1 which utilizes the pointing stick 33 by inputting the combination of the specific keys including the modifier key (for example, the depressing of the "Fn" key+ the "G" key) via the keyboard 32 and thereby to further improve the convenience.

In addition, in one embodiment of the present invention, the menu screen is the screen (the settings menu screen MG 1) which indicates the menu for changing the setting of the input device or the output device.

Thereby, it becomes possible for the Laptop PC 1 according to one embodiment of the present invention to execute with ease changing of the setting of the input device or the output device and to more improve the usability.

In addition, a controlling method according to one embodiment of the present invention is a method of controlling the operation of the Laptop PC 1 which includes the pointing stick 33. In a case where the pointing stick 33 detects the specific operation which includes the displacement of the stick in the vertical direction, the main control unit 10 controls to display the previously determined menu screen on the display unit 14. Here, the pointing stick 33 has the operable stick which is disposed on the keyboard 32 and therefore it is possible to detect the displacement in the stick installation plane direction and the displacement in the direction which is vertical to the stick installation plane.

Thereby, it becomes possible for the controlling method according to one embodiment of the present invention to exhibit the effects which are the same as those of the Laptop PC 1 and to realize the user interface which utilizes the pointing stick 33 and is high in usability.]

In addition, the Laptop PC 1 (the information processing apparatus) according to one embodiment of the present invention may have the following form. The Laptop PC 1 (the information processing apparatus) according to one embodiment of the present invention includes the pointing stick 33, the main memory 12 (the memory) which temporarily stores the program and a processor (the main control unit 10) which executes the program which is stored in the memory (the main memory 12). The pointing stick 33 is disposed on the keyboard 32, has the operable stick and the ability to detect the displacements in the stick installation plane direction (the XY axial plane direction) and the displacement in the direction (the Z-axis direction) which is vertical to the installation plane. The processor (the main control unit 10) executes the program which is stored in the memory (the main memory 12) and thereby, in a case where the pointing stick 33 detects the specific operation (for example, the double-tap operation which is performed on the pointing stick 33) which includes the displacement of the stick in the vertical direction, the processor (the main control unit 10) executes the process of displaying the previously determined menu screen (for example, the settings menu screen MG 1) on the display unit 14.

Thereby, the controlling method according to one embodiment of the present invention exhibits the effects which are the same as those of the Laptop PC 1 and makes it possible to realize the user interface which utilizes the pointing stick 33 and is high in usability.

Incidentally, the present invention is not limited to the above-described embodiment and is allowed to be modified within the range not deviating from the gist of the present invention.

For example, in the above embodiment, although the example that the information processing apparatus is the Laptop PC 1 is described, the information processing apparatus is not limited to the Laptop PC 1 and may be the information processing apparatus of another type on condition that the information processing apparatus is of the type which includes the pointing stick 33.

In addition, although in above the embodiment, the example that the information processing apparatus (the Laptop PC 1) includes the embedded controller 31 and detects the specific operation which is performed on the pointing stick 33 via the embedded controller 31 is described, the present invention is not limited to that example. The information processing apparatus (the Laptop PC 1) may be of the form that the embedded controller 31 is not included and may be so configured as to detect the specific operation with no interposition of the embedded controller 31.

In addition, although in the above embodiment, the example that the specific combination of the keys on the keyboard 32 for prohibiting or permitting execution of the process of displaying the settings menu screen MG 1 is the "Fn" key+ the "G" key and the "Fn" key+ the "G" key are depressed in a combined state is described, the combination of the keys is not limited to the above combination and may be other specific combinations (other hotkeys).

In addition, although in the above embodiment, the example that the specific operation which is performed on the pointing stick 33 for displaying the settings menu screen is the double-tap operation which is performed on the pointing stick 33 is described, the specific operation is not limited to the double-tap operation and other specific operations may be performed on the pointing stick 33. The specific operation may be, for example, an operation of holding down the pointing stick 33, an operation of drawing a predetermined shape while depressing the pointing stick 33 and so forth.

In addition, although in the above embodiment, the example that the same combination (depressing of the "Fn" key+ the "G" key) is used as the specific combination for prohibiting execution of the process of displaying the settings menu screen MG 1 and as the specific combination for permitting execution of the process of displaying the settings menu screen MG 1 is described, the combination of keys is not limited to the above combination and a different combination of keys (another hotkey) may be used.

Incidentally, each of the constitutional elements that the Laptop PC 1 includes has a computer system which is built in each constitutional element. Then, the process of each constitutional element that the Laptop PC 1 includes may be performed by recording a program for realizing the function of each constitutional element that the Laptop PC 1 includes into a computer-readable recoding medium, reading the program which is recorded in the recording medium into the computer system and executing the program. Here, "reading the program which is recorded in the recording medium into the computer system and executing the program" includes installation of the program into the computer system. Here, "the computer system" shall include the OS and hardware such as the peripherals and so forth.

In addition, the "computer system" may also include a plurality of computers which is mutually connected over a network which includes communication lines such as the Internet, a WAN (Wide Area Network), a LAN (Local Area Network), a lease line and so forth. In addition, the "computer-readable recording medium" means a portable medium such as a flexible disc, a magneto-optical disc, a ROM, a CD-ROM and so forth and a storage device which is built in the computer system such as a hard disc and so forth. As described above, the recording medium which stores the program may be also a non-transitory recording medium such as the CD-ROM and so forth.

In addition, also an internally or externally installed recording medium which is accessible from a distribution server for distribution of the program concerned is included in the recording medium. Incidentally, a configuration that one program is divided into a plurality of partial programs and these partial programs are downloaded at mutually different timings and then the partial programs are mutually combined by the respective constitutional elements that the Laptop PC 1 includes may be also made and distribution servers which distribute the divided partial programs respectively may be different from one another. Further, "the computer readable recording medium" shall include a medium of the type of holding the program for a definite period of time such as a server which works in this way in a case where the program is transmitted to the server over the network and a volatile memory (a RAM) which is built in each computer system which serves as a client. In addition, the program may be of the type of realizing some of the above-described functions. Further, the program may be of the type of making it possible to realize the above-described functions by combination with a program which is recorded in advance in each computer system, that is, may be also a so-called differential file (a differential program).

In addition, some of or all the functions which are described above may be realized in the form of an integrated circuit such as an LSI (Large Scale Integration) and so forth. The respective functions may be processorized individually and/or some of or all the functions may be mutually integrated and then processorized. In addition, a technique of circuit integration may be realized by a private circuit or a general-purpose processor, not limited to the LSI. In addition, in a case where a novel circuit integration technology which realizes an integrated circuit which will take the place of the LSI emerges owing to advancement of the semiconductor technology, the integrated circuit which is realized by the novel technology may be also used.

DESCRIPTION OF SYMBOLS

1: Laptop PC
10: main control unit
11: CPU
12: main memory
13: video subsystem
14: display unit
21: chipset
22: BIOS memory
23: HDD
24: audio system
25: WLAN card
26: USB connector
27: imaging unit
28: microphone
29: loudspeaker
31: embedded controller
32: keyboard
33: pointing stick
34: power source circuit
101: BIOS
102: PM driver
103: base utility
104: GUI application

What is claimed is:

1. An information processing apparatus comprising:
   a pointing stick that is disposed on a keyboard, has an operable stick, and detects a displacement in an installation plane direction of the pointing stick and a displacement in a direction vertical to the installation plane; and
   a main controller that displays a previously determined menu screen on a display in a case where the pointing stick detects a specific operation which includes the displacement of the stick in the vertical direction, wherein
   the main controller includes:
      a utility processing section which senses that the pointing stick detects the specific operation in accordance with an event of a hotkey, and
      a GUI processing section which displays the menu screen on the display in a case where the utility processing section receives the event of the hotkey.

2. The information processing apparatus according to claim 1, wherein the GUI processing section,
   in a case where the GUI processing section detects inputting of a specific combination of a plurality of keys which includes a modifier key via the keyboard in a permitted state where execution of a process of displaying the menu screen is permitted, ignores detection of the specific operation and transitions to a prohibited state where execution of the process of displaying the menu screen is prohibited, and
   in a case where the GUI processing section detects the inputting of the specific combination of the plurality of keys which includes the modifier key via the keyboard in the prohibited state, transitions to the permitted state.

3. The information processing apparatus according to claim 2, wherein the GUI processing section
   transitions to a hidden state where the menu screen is not displayed on the display in a case where an out-of-area part of the menu screen is clicked or in a case where a display exit button in the area of the menu screen is clicked.

4. The information processing apparatus according to claim 3, wherein the menu screen is a screen which displays a menu of changing a setting of an input device or an output device.

* * * * *